US012553286B2

(12) United States Patent
Feißt et al.

(10) Patent No.: US 12,553,286 B2
(45) Date of Patent: Feb. 17, 2026

(54) DEVICE FOR SINKING A VERTICAL BOREHOLE

(71) Applicant: HERRENKNECHT AG, Schwanau (DE)

(72) Inventors: Albert Feißt, Achern-Önsbach (DE); Patrick Rennkamp, Lahr (DE); Tilmann Schwab, Freiburg (DE)

(73) Assignee: Herrenknecht AG, Schwanau (DE)

( * ) Notice: Subject to any disclaimer, the term of this patent is extended or adjusted under 35 U.S.C. 154(b) by 797 days.

(21) Appl. No.: 17/781,445

(22) PCT Filed: Dec. 4, 2020

(86) PCT No.: PCT/EP2020/084777
§ 371 (c)(1),
(2) Date: Mar. 1, 2023

(87) PCT Pub. No.: WO2021/110996
PCT Pub. Date: Jun. 10, 2021

(65) Prior Publication Data
US 2025/0198284 A1   Jun. 19, 2025

(30) Foreign Application Priority Data

Dec. 4, 2019   (DE) .................... 10 2019 133 088.2

(51) Int. Cl.
*E21D 1/06*   (2006.01)
*E21B 4/18*   (2006.01)

(52) U.S. Cl.
CPC . *E21B 4/18* (2013.01); *E21D 1/06* (2013.01)

(58) Field of Classification Search
CPC ... E21D 1/06; E21B 4/00; E21B 4/006; E21B 4/18; E21B 4/20; E21B 3/00; E21B 3/02; E21B 3/03
See application file for complete search history.

(56) References Cited

U.S. PATENT DOCUMENTS

| 10,202,807 | B2 | 2/2019 | Li et al. |
| 2016/0130942 | A1 | 5/2016 | Burger |
| 2016/0369566 | A1* | 12/2016 | Li ........................... E21B 3/02 |

FOREIGN PATENT DOCUMENTS

| EP | 0741227 A2 | 8/2003 |
| KR | 101762879 B1 | 7/2017 |

* cited by examiner

*Primary Examiner* — Kristyn A Hall
(74) *Attorney, Agent, or Firm* — Mark Rodgers

(57) ABSTRACT

The invention relates to a device for sinking a vertical borehole, more particularly a shaft, an extraction borehole in a deposit body, or a foundation borehole in the ground, with at least one excavating tool for excavating material from the bottom of the borehole, with an at least one conveyance means arranged in the active region of the at least one excavating tool for conveying away from the borehole material excavated from the bottom, with a machine frame on which at least two bracing elements are arranged for locking the device in the borehole during boring, with at least one means for vertically raising and lowering the boring device in the borehole and with at least one drive for rotating the excavation tool.

22 Claims, 11 Drawing Sheets

Figure 1:
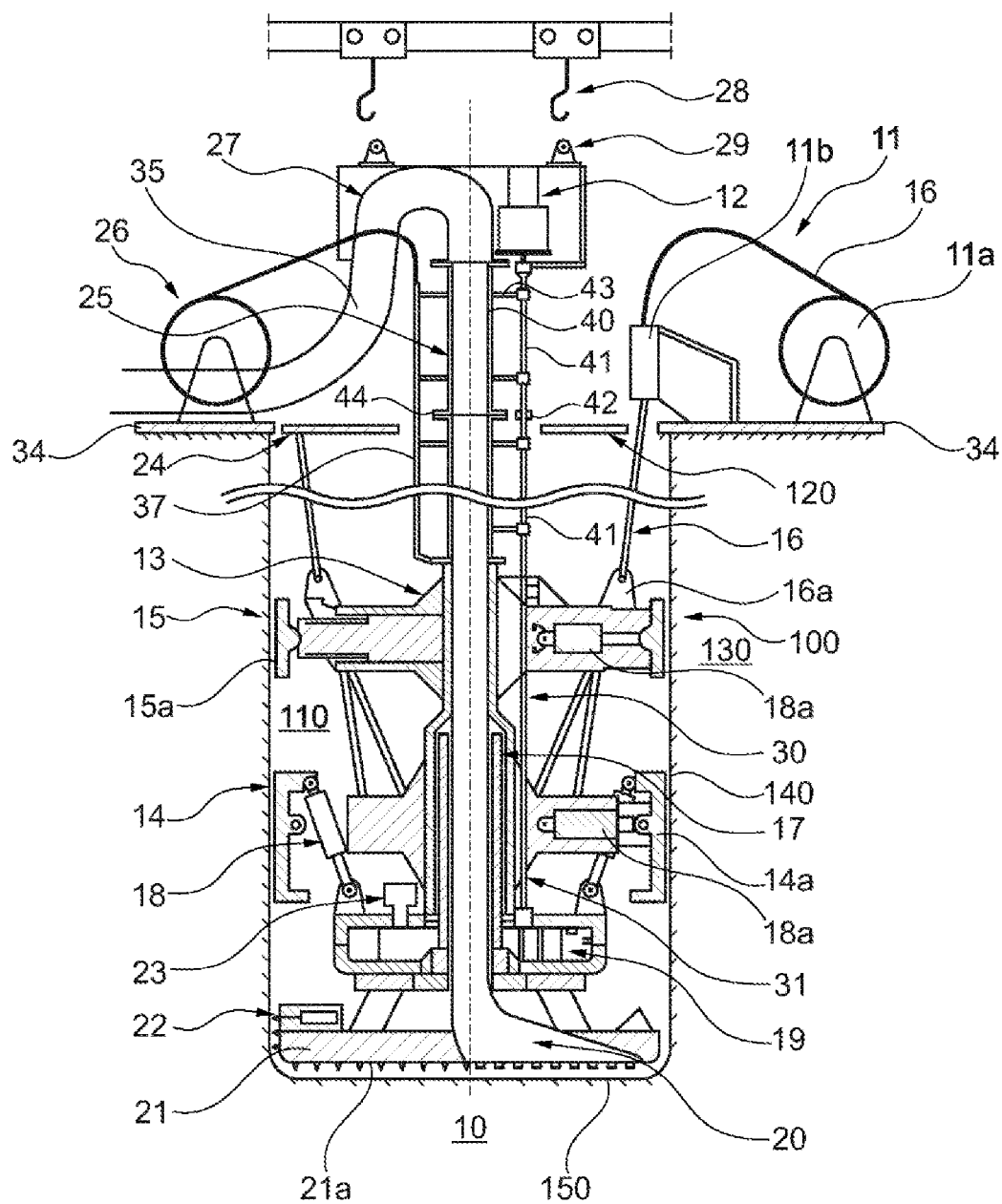

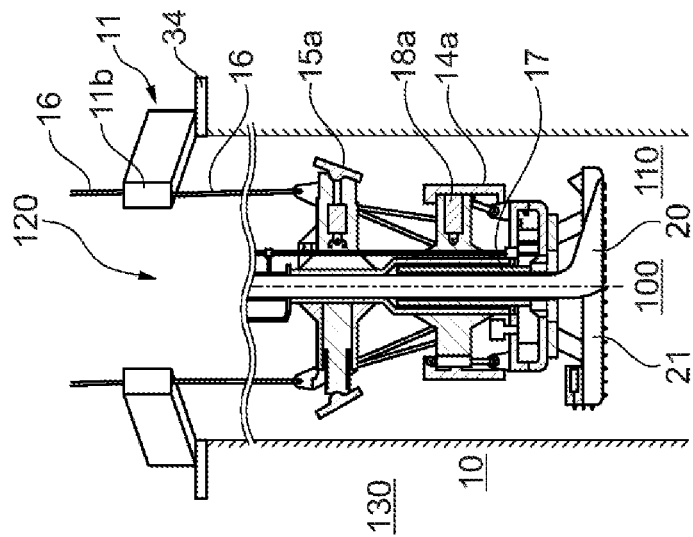
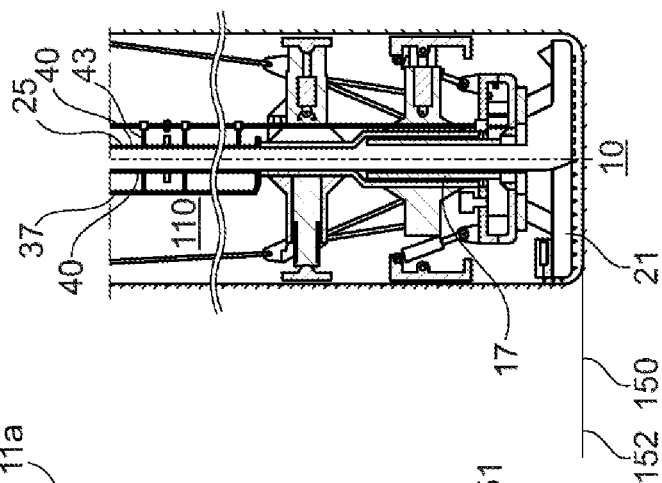
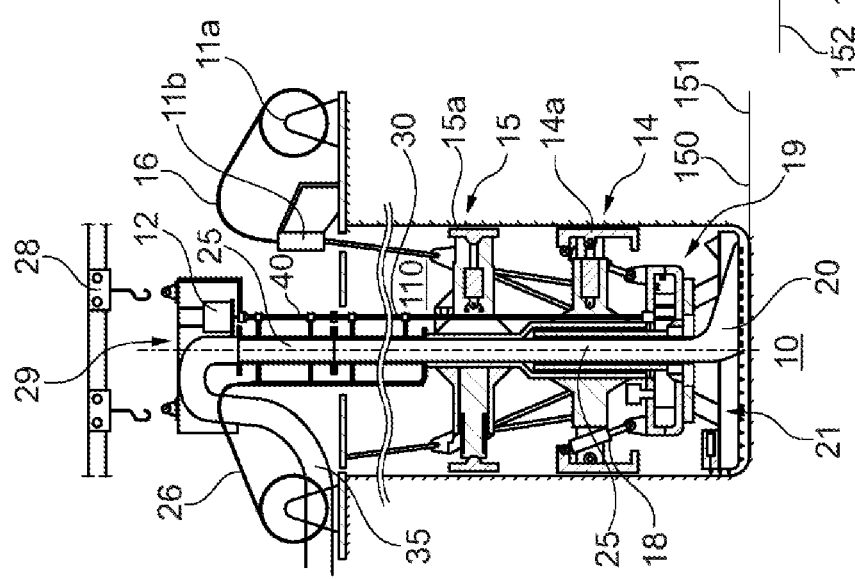

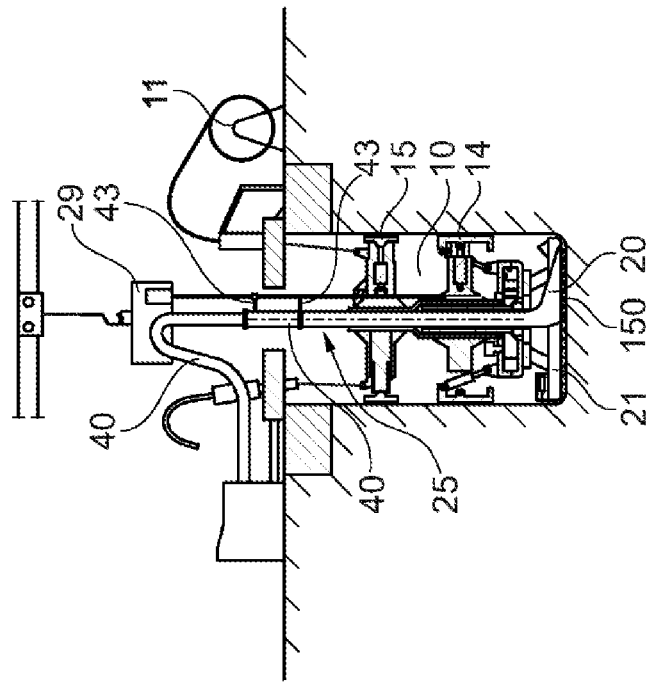
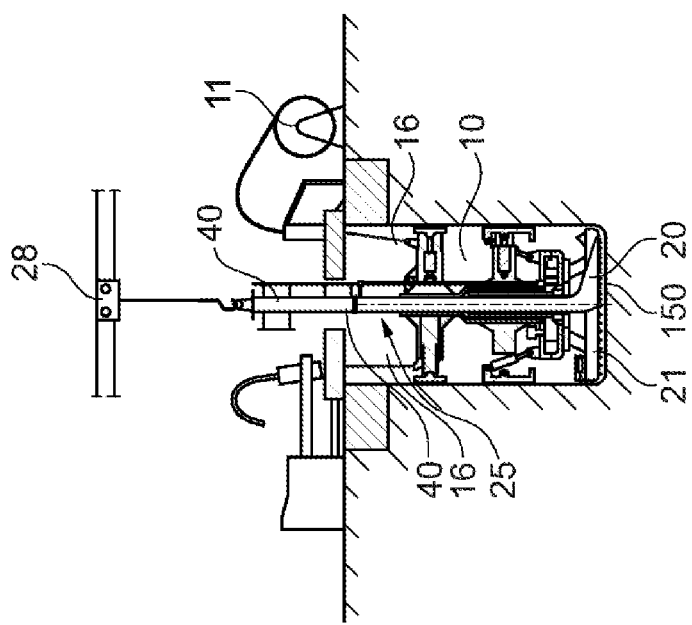

DEVICE FOR SINKING A VERTICAL BOREHOLE

The invention relates to a device for sinking a vertical borehole, in particular a shaft, an extraction borehole in a deposit body, or a foundation borehole in the ground.

When vertical boreholes in the ground are being created, groundwater-bearing strata are problematic. For instance, in order to keep the water out of the borehole, in order to be able to drill dry, either the rock has to be frozen or the groundwater level has to be lowered. If this is not possible, drilling has to be carried out under water, with the result that the boreholes cannot be accessed on foot. This is problematic, particularly in the case of relatively large diameters and long borehole lengths.

If, for instance, drilling in a deposit is to be carried out, where possible the drilling device conveys the rock containing the valuable mineral directly. In this case, a drilling pattern can be followed, so that the boreholes created are subsequently filled again, in order to achieve the lowest possible loss of the deposit body.

In order to carry out this method, a conveying means for vertical movement of the drilling device at the bore is made available on the surface. Furthermore, in this connection it is known—amongst other things, from the prior art—that a top drive is provided which drives the drilling head itself via a rod linkage.

The loosened ground, together with the liquid located in the bore, is then transported to the surface by the drive linkage, for instance by means of an airlift method, and is processed appropriately.

The object of the invention is to make available a device with which vertical boreholes, also under water with large diameters, can be carried out without operating personnel. The boreholes may be shafts, extraction boreholes in deposits, or foundation boreholes. The diameters in these cases amount to more than 4 m. Aspects that have to be considered in these cases are the vertical movement of the drilling device in the borehole, the drive of the drilling tool, the conveying of the loosened ground, and the connection to above ground between the drilling tool and the installations located on the surface.

In accordance with the invention, the invention provides a drilling device according to the solution specified in claim 1. Further statements relating to this device are set forth in the dependent claims.

The invention provides a device for sinking a vertical borehole, in particular a shaft, an extraction borehole in a deposit body, or a foundation borehole in the ground, with at least one excavating tool for excavating material at a bottom of the borehole, with at least one conveying means, arranged in the active region of the at least one excavating tool, for discharging material excavated on the bottom out of the borehole, with a machine frame on which at least two bracing elements for locking the device in the borehole during drilling are arranged, with at least one means for vertical raising and lowering of the drilling device in the borehole, and with at least one drive for rotating the excavating tool.

A further teaching of the invention provides that the means for vertical raising and lowering of the drilling device in the borehole is a strand-jack system with at least one jack unit with at least one cylinder and with at least one strand or a strand bundle per jack unit, said strand or strand bundle being connected to the machine frame. In this case, it is advantageous that the jack unit exhibits at least one strand lock. A further teaching of the invention provides that at least one fastening per strand or strand bundle is provided on the machine frame. By this means, a possibility that does not require a headgear or cost-intensive winches is created in straightforward and inexpensive manner.

A further teaching of the invention provides that the borehole is filled with a liquid, preferably water or a bentonite suspension. A further teaching of the invention provides that the at least one conveying means for discharging material excavated on the bottom out of the borehole exhibits a vertical conveying pipeline which preferably extends through the machine frame. A further teaching of the invention provides that the conveying pipeline does not rotate. A further teaching of the invention provides that compressed air is capable of being introduced into the conveying pipeline at at least one delivery point. A further teaching of the invention provides that discharge is effected in a reverse-circulation method. By this means, conveying is possible in straightforward manner.

A further teaching of the invention provides that the conveying pipeline has been constructed from pipe sections, so that the conveying pipeline is capable of being successively lengthened or shortened. In this case, it is advantageous that at least one pipe section exhibits at least one flange element for connecting to a further pipe section. In this case, it is advantageous, furthermore, that at least one pipe section exhibits at least one guide element, said at least one guide element guiding an element of a drivetrain, and said guide element preferably exhibiting at least one bearing element. A further teaching of the invention provides that at least one pipe section exhibits at least one guide element for a supply line. By this means, it becomes possible to enable a conveying of the loosened ground without the conveying pipeline rotating and/or having to serve for transmitting forces.

A further teaching of the invention provides that at least two bracing elements, arranged vertically one above the other, are provided for locking the device in the borehole. By this means, an optimal bracing for the purpose of load transfer can be effected. Furthermore, with the upper and/or lower bracing elements it is also possible to bring about a guidance in the borehole. Steering is also possible with the aid of the bracing elements of the drilling device. Furthermore, it is advantageous that the bracing elements act as a stop for feed elements or feed cylinders for the excavating tool.

A further teaching of the invention provides that the excavating tool is a cutting wheel, preferably with full-face cutting, which particularly preferably exhibits edge-cutting tools that are capable of being extended and retracted, and/or that disks or chisels have particularly preferably been provided.

A further teaching of the invention provides that the excavating tool has been realized so as to be displaceable in the excavating direction with respect to the machine frame.

A further teaching of the invention provides that at least one feed system, preferably a cylinder, is provided which presses the excavating tool for loosening rock against the bottom of the borehole, in order to generate the necessary loosening pressure. The feed system preferably acts on at least one of the bracing elements.

A further teaching of the invention provides that the excavating tool exhibits a suction chamber for loosened rock. By this means, a secure and simple aspiration of the drill cuttings or loosened ground can be effected.

A further teaching of the invention provides that the at least one drive exhibits above ground a drive unit which is connected to a drive element of the excavating tool. This is advantageous, because a simple transmission of force to the excavating tool can be effected. In this case, it is advantageous that the connection is made via a gear mechanism, preferably a reduction-gear mechanism. A central gearwheel, which is connected to the gear mechanism, is advantageously provided on the drilling head. Advantageously, this gear arrangement is mounted in oil and exhibits a pressure-compensating mechanism.

It is advantageous, furthermore, that the drive unit is connected to the drive element of the excavating tool via at least one preferably telescopic drivetrain.

It is advantageous that the drivetrain is composed of individual rods or tube elements.

It is advantageous, furthermore, that the individual rods or tube elements are separably connected to one another via connecting elements such as threads or couplings, preferably claw couplings.

A further teaching of the invention provides that the rods or tube elements are guided along the pipe sections, preferably via guide elements which are provided along the pipe sections, particularly preferably in bearing elements.

A further teaching of the invention provides that at least one rod is telescopic, in order to enable the drilling stroke of the excavating tool.

A further teaching of the invention provides that the drive exhibits at least one gear unit with which the necessary speed of rotation of the excavating tool can be made available.

A further alternative teaching of the invention provides that the at least one drive is a hydraulic or electric drive or a combination thereof.

It is advantageous that the drive is arranged on the machine.

It is advantageous, furthermore, that the drive is arranged on the machine in a chamber filled with air.

It is preferred that there is an overpressure in the chamber with respect to the bore filled with liquid.

Furthermore, it is advantageous that the chamber exhibits an opening in the downward direction toward the bottom, from which air is able to escape from the chamber, and the air is capable of being supplied to the chamber with overpressure from above ground.

Figure 2:
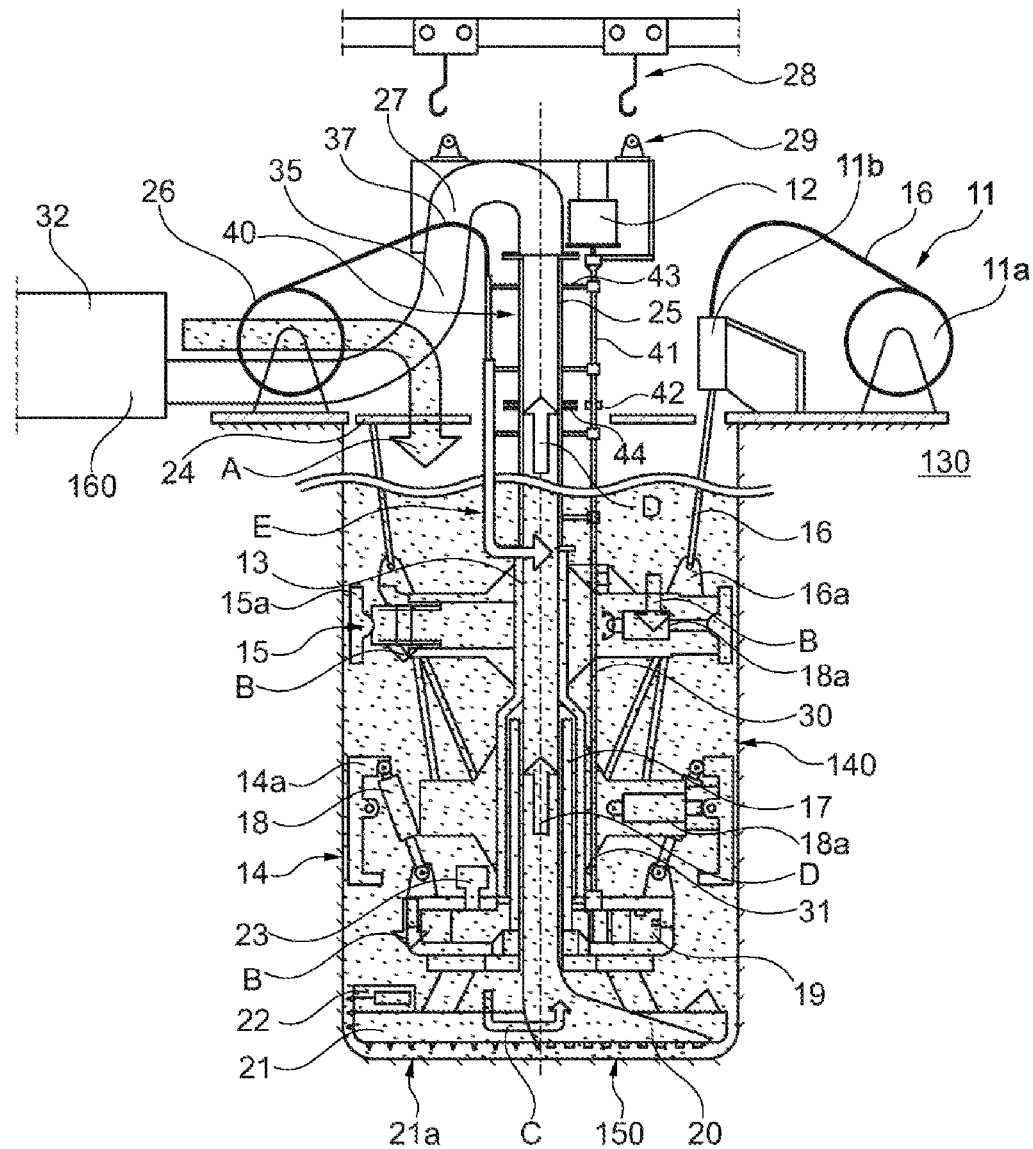
Figure 3:
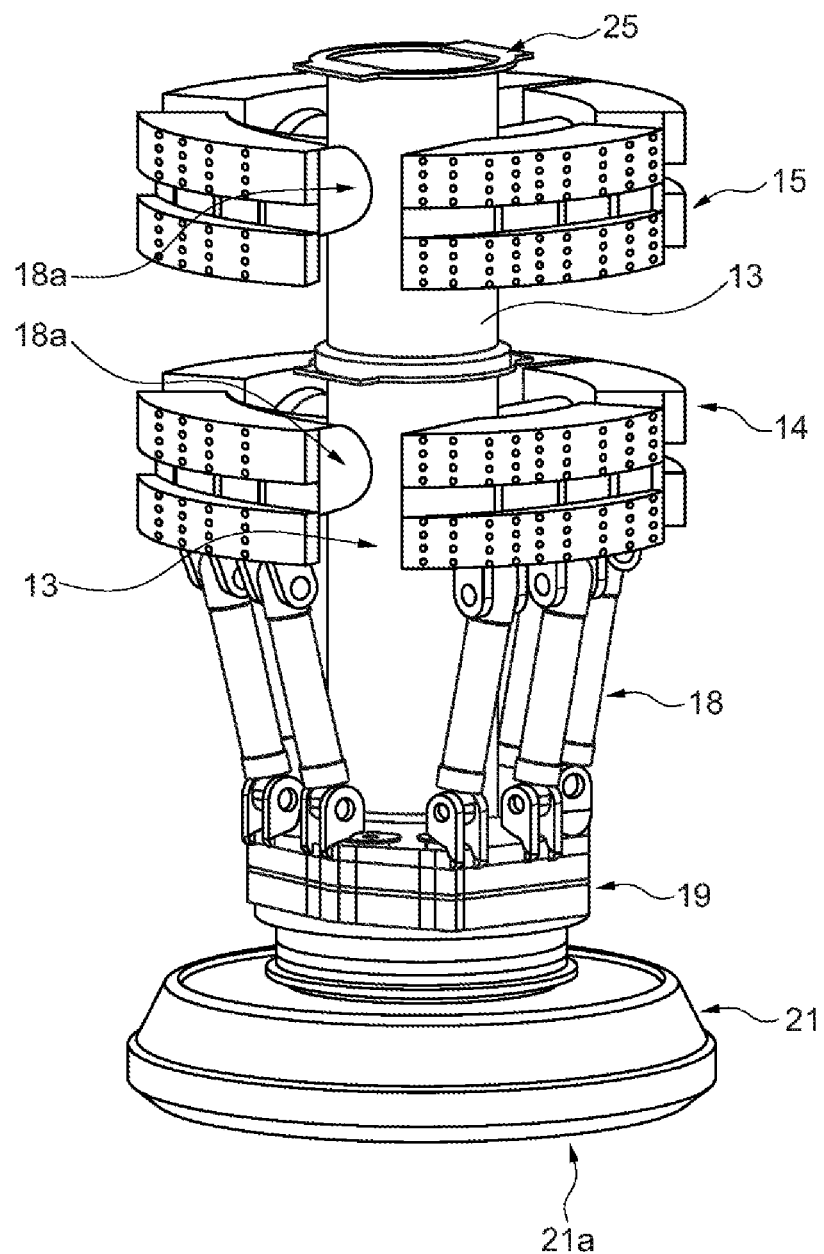
Figure 4A:
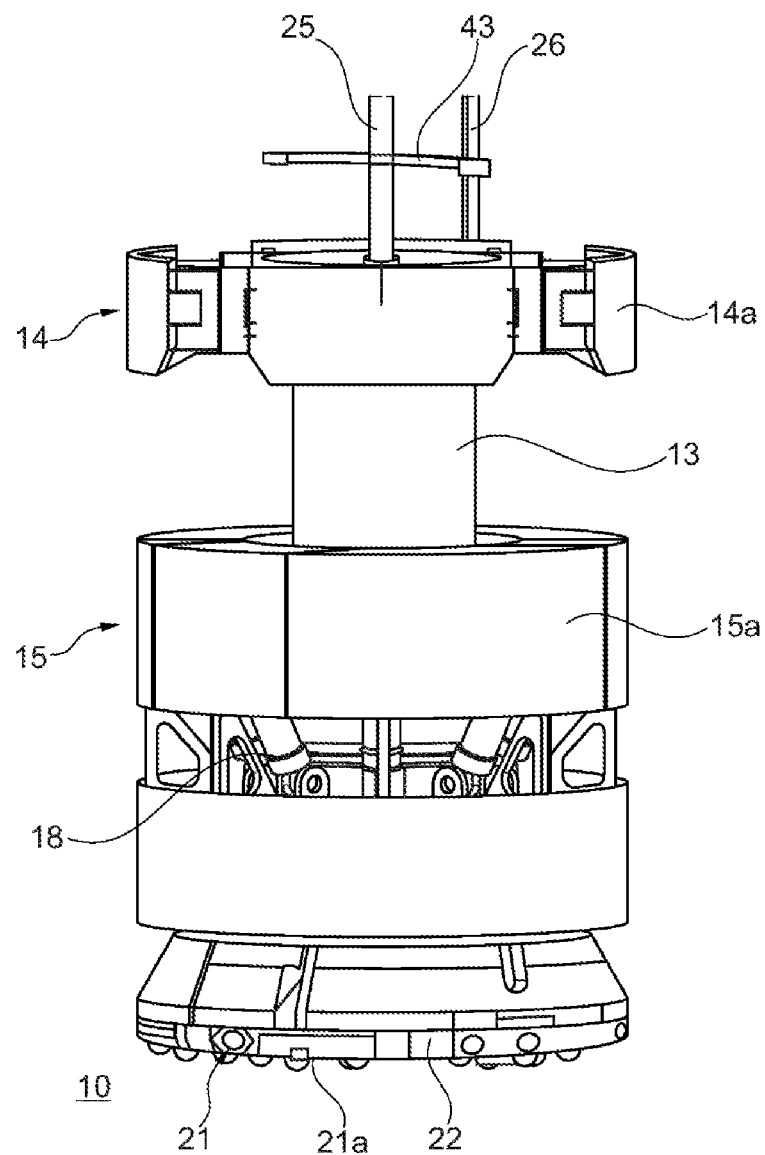
Figure 4B:
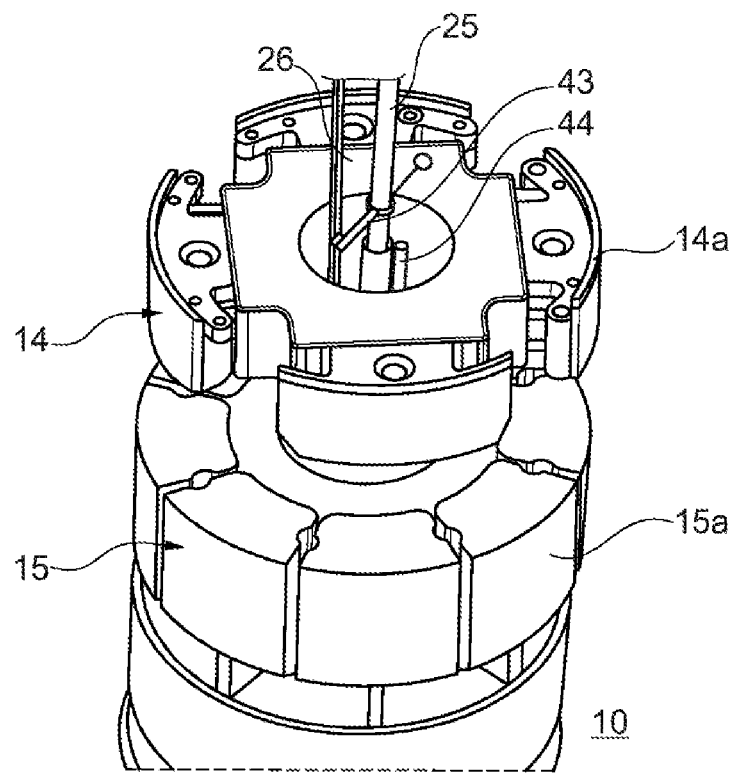
Figure 4C:
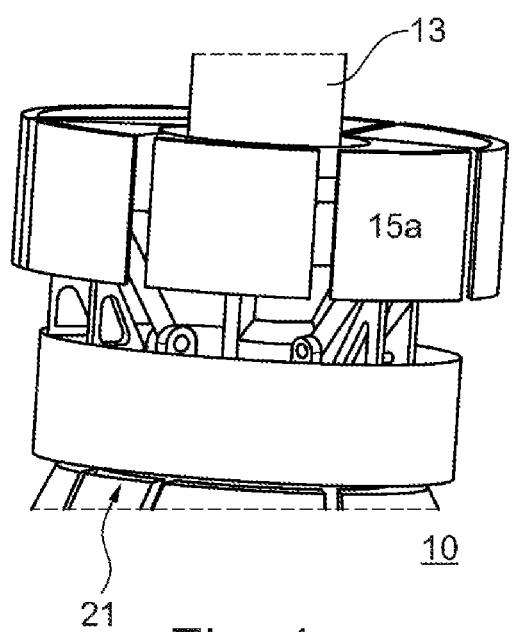
Figure 5:
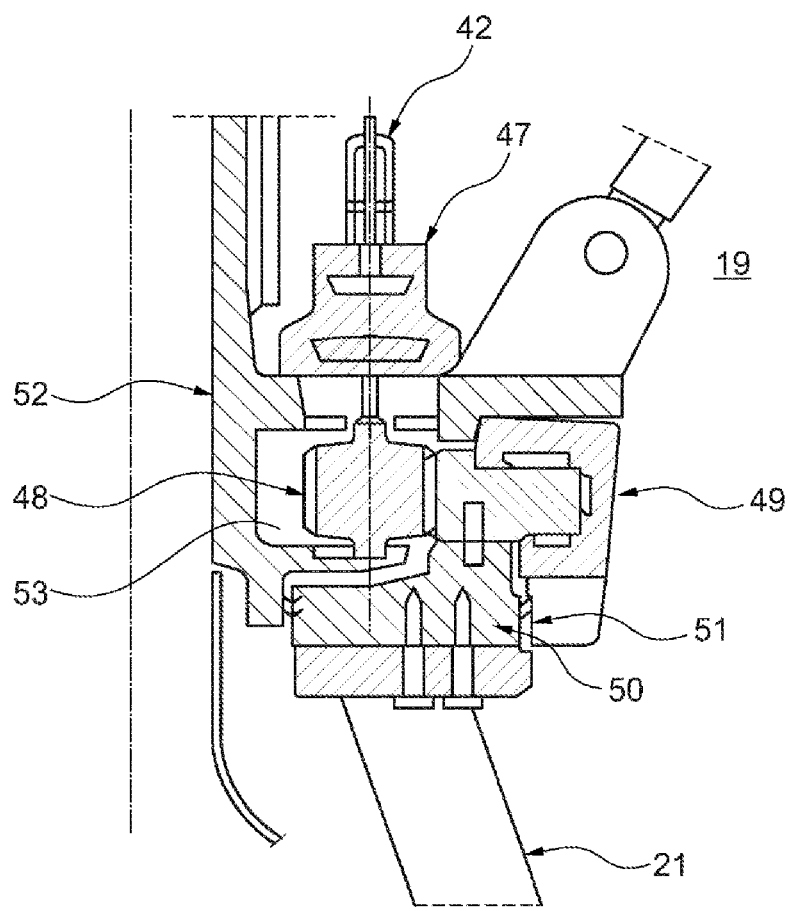
Figure 6:
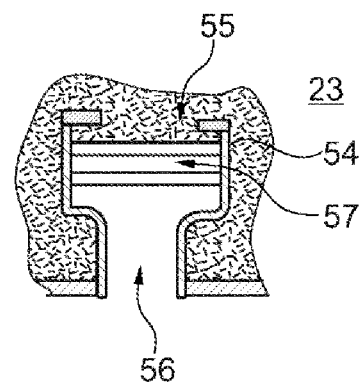
Figure 7A:
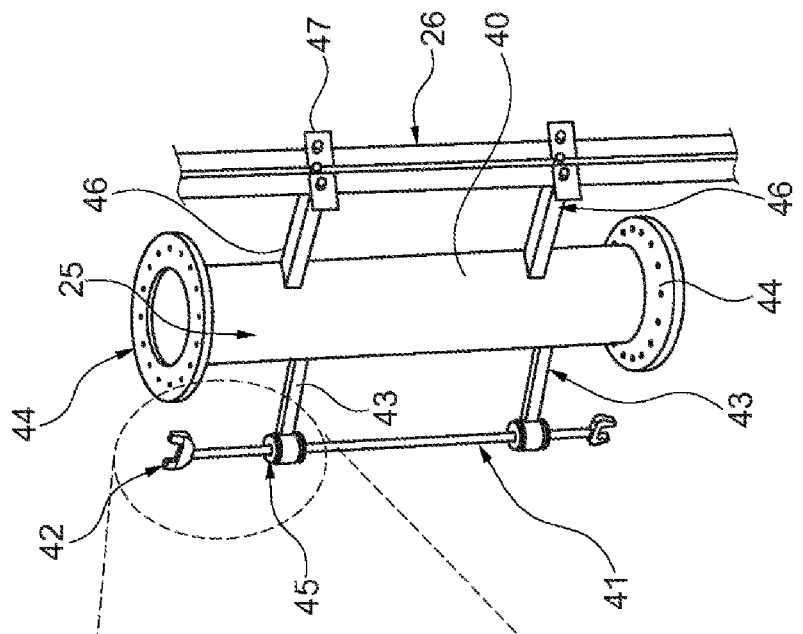
Figure 7B:
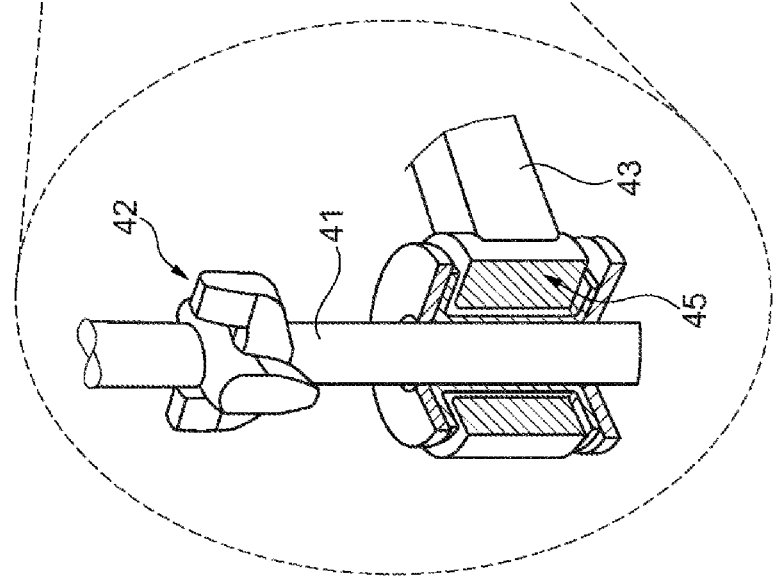

The invention will be elucidated in more detail below with reference to exemplary embodiments in conjunction with a drawing. Shown therein are:

FIG. 1 a schematic side view of a device according to the invention,

FIG. 2 a view analogous to FIG. 1 with additions,

FIG. 3 a spatial schematic representation of a first embodiment of the drilling part of the device according to the invention, FIGS. 4a-4c a spatial schematic representation of a second embodiment of the drilling part of the device according to the invention, FIG. 5 a first enlarged detail view relating to FIG. 1, FIG. 6 a second enlarged detail view relating to FIG. 1, FIG. 7a a spatial schematic view of a pipe section according to the invention, FIG. 7b an enlarged detail view relating to FIG. 7a, FIGS. 8a-8c a schematic view of a drilling sequence relating to the device according to the invention, and FIGS. 9a-9f a schematic view of a starting sequence relating to the device according to the invention.

FIG. 1 shows a drilling device 10 according to the invention. The drilling device 10 is arranged in and on a bore 100 which is filled with a liquid 110—for instance, water or a bentonite suspension. The bore 100 exhibits an opening 120 on its upper side, which is covered with a cover 24 during operation.

A foundation 34 is provided around the opening 120. On the foundation 34, which is provided for the purpose of introducing forces into the ground 130, a strand-jack system 11 is provided. The strand-jack system 11 includes a winch 11A and a jack-cylinder arrangement 11B. The strand-jack system 11 further includes a strand or a strand arrangement 16. The strands 16 are connected to a machine frame 13 of the drilling device 10 via stops 16A. The machine frame 13 is provided with a lower bracing element 14 and an upper bracing element 15. The bracing elements 14, 15 each exhibit at least one feed cylinder 18A, in order to move the movable parts 14A, 15A of the bracing elements 14, 15 against the bore wall 140, to release them therefrom, and to brace them against the bore wall 140.

The bracing elements 14, 15 exhibit a plurality of movable elements 14A, 15A which are arranged encircling the machine frame 13. The movable elements 14A, 15A are capable of being moved between a retracted position and a braced position via the feed cylinders 18A.

The drilling device 10 according to the invention further exhibits a cutting wheel 21 which is equipped with individual drilling tools 21A such as disks or chisels, for instance. The cutting wheel 21 further exhibits extendable and retractable edge-cutting tools 22, in order, for instance, to profile the bore wall 140 precisely or, where appropriate, to be able to bring about a change in direction or an undercut. The cutting wheel 21 is further provided with a suction box 20 for receiving loosened ground or drill cuttings 160.

By "ground" in this disclosure, any form of loose or solid rock or valuable mineral of a deposit is understood. The terms "drill cuttings" and "loosened ground" are used synonymously.

The suction box 20 is part of the conveying means of the drilling device 10.

The cutting wheel 21 is rotatable and arranged so as to be capable of being moved back and forth with respect to the machine frame 13 via a telescopic arrangement 17. Furthermore, the cutting wheel 21 can be driven by a main drive 12, which in the embodiment represented is arranged above ground in a top box 29, and can be set in rotation thereby.

Alternatively, the drive may also have been provided—for instance, hydraulically or electrically—in the bore 100, for instance fixed to the machine frame 13. For this purpose, an enclosed chamber, not represented, may have been provided on the machine frame 13, in which the electric drive and/or the hydraulic drive are/is provided and which out of this is connected to the cutting wheel 21, in order to set the latter in rotation.

In a preferred embodiment, not represented, this chamber is realized so as to be open in a downward direction and is kept liquid-free as regards water or bentonite suspension 110 with the aid of compressed air. By this means, elaborate seals for the drivetrain with respect to the housing of the chamber may be dispensed with.

Furthermore, a central drive 19, also designated as a bull gear or revolving central gearwheel, is arranged on the cutting wheel 21. This drive is represented in FIG. 5 and will subsequently be elucidated in more detail.

The telescopic arrangement 17 is connected to a feed cylinder 18 which here, for instance, is arranged diagonally and has been provided with its other end on the movable element 14A of the lower bracing elements 14. After the bracing of the lower bracing elements 14 and of the upper bracing elements 15, the cutting wheel 21 can be pressed against the bottom 150 of the bore 100 via the feed cylinders 18, so that by this means a sufficient contact pressure arises on the bottom 150 such that the disks 21A of the cutting wheel 21 loosen the naturally occurring ground or rock. The central drive 19 exhibits a pressure-compensating device 23 which is represented in FIG. 6 and will be elucidated below.

The conveying means of the drilling device 10 includes a conveying pipeline 25 which has been formed from individual pipe sections 40 which are connected to one another via flanges 44. The conveying pipeline 25 has been realized here as a central pipeline that does not transmit any rotational forces. Furthermore, the conveying pipeline 25 also does not transmit any lifting forces with respect to the drilling device 10. The drill cuttings 160 are introduced, together with the liquid 110 located in the bore 100, from the bottom 150 into the suction box 20 in arrow direction C and are aspirated from there into the conveying pipeline 25. The conveying itself in the conveying pipeline 25 is effected by a supply of compressed air in arrow direction E, which is introduced into the conveying pipeline 25 via a compressed-air line 37 as part of the supply lines 26 in the upper part, as a result of which the density of the liquid 110 is reduced, so that a movement upward in the conveying pipeline 25 occurs. As a result, the mixture of drill cuttings 160 and liquid 110 in the conveying pipeline 25 is conveyed out of the bore in arrow direction D. By this means, an aspiration into the suction box 20 in arrow direction C is brought about.

At the upper end of the conveying pipeline 25 a deflecting pipe 27 is provided, with which the conveyed mixture is suppled to the processing unit 32 via a pipeline 35. In the processing unit 32 the drill cuttings 160 are separated from the liquid 110. The liquid 110 (water or bentonite suspension) is then supplied to the bore 100 again in arrow direction A via a supply line 36.

Here, the deflecting pipe 27 is preferably part of the top box 29.

FIGS. 3 and 4a to 4c show different arrangements with regard to the bracing elements 14, 15 of the device according to the invention in different embodiments.

The main drive 12 is connected to the central drive 19 of the cutting wheel 21 via a drivetrain 30. A telescopic drive rod 31 is provided for the purpose of compensating for the feed, capable of being introduced via the feed cylinders 18 and the telescopic arrangement 17, of the cutting wheel 21 with respect to the machine frame 13. The drivetrain 30 itself has been formed from drive rods 41 which are connected to one another via connecting elements 42, here preferably represented as open-end couplings.

The drive rods are preferably connected to the pipe sections 40 via guide elements 43. The guide elements 43 exhibit bushings or bearings 45. The guide elements 43 have been represented in FIGS. 7A and 7B along the pipe sections 40. Furthermore, guide elements 46 with connectors 47 for the supply lines 26 have been provided along the pipe sections 40.

FIG. 5 shows the central drive 19 in detail. A connecting element 42 of the drivetrain 30 engages in a gear mechanism 47, preferably a planetary gear mechanism. The planetary gear mechanism 47 is connected to a gearwheel 48 which engages in a central gearwheel or bull gear 49. The central gearwheel 49 is seated on a flange 50 which is firmly connected to the cutting wheel 21.

By rotation of the drivetrain 30 with the main drive 12, with the gear mechanism 47 the necessary speed of rotation of gearwheel 48 is generated, at which the central gearwheel 49 is then rotated, as a result of which the cutting wheel 21 is then likewise rotated, and the disks or chisels 21A are able to excavate the bottom 150.

The central drive 19 exhibits a housing 52 in which the central gearwheel 49 and gearwheel 48 are located. The cavities 53 are filled with transmission oil. The flange 50 is sealed with respect to the housing 52 via a seal 51.

For the purpose of pressure compensation, a pressure-compensating device 23 is provided. The latter includes a housing 54 which on the one side exhibits an opening 55 toward the bore 100 and on the other side exhibits an opening 56 which is connected to the cavity 53 of the housing 52. A cylinder 57, which has been realized so as to be movable in the housing 54, is provided in the housing 54 as separation and, at the same time, for pressure compensation. By this means, it is possible to realize the seal 51 as minimally as possible. This has cost advantages.

FIG. 8A shows the drilling device 10 with retracted cutting wheel 21 at a first level 151 of the bottom 150 at the beginning of a drilling cycle.

FIG. 8B shows the end of the drilling cycle, at which the bore bottom 150 has been drilled out to level 152 by the cutting wheel 21.

FIG. 8C shows the drilling device with retracted cutting wheel 21 and retracted bracing elements 14, 15, so that the drilling device 10 is capable of being moved vertically in the bore 100 with the aid of the strand-jack system 11. This state which is represented in FIG. 8C arises when the drilling device 10 is removed from the bore 100 or re-inserted.

For the purpose of lowering the drilling device 10 for the purpose of carrying out a further drilling cycle, the bracing elements 14, 15 are released slightly and the strand-jack system 11 lowers the machine frame 13 with respect to the cutting wheel 21, so that the telescopic arrangement 17 retracts again. When the machine frame 13 is being lowered, it is also guided by the telescopic arrangement 17.

A guidance of the drilling device can additionally be effected at least by the upper bracing elements 15. Once the telescopic arrangement 17 has retracted again, the drilling device 10 is finally braced again with respect to the bore wall 140 by the movable elements 14A, 15A being extended via the bracing cylinders or feed cylinders 18A.

Prior to the bracing, a check is made as to whether the drilling device 10 is oriented vertically or, to be more exact, in the direction of drilling. If this is the case, the bracing is concluded via the extending of the feed cylinders 18A. If this is not the case, the deviating strands 16 have to be retracted or extended further by reorientation of the jack cylinders 11B of the strand-jack system 11 until the desired orientation has been attained.

FIGS. 9A to 9F show the installation cycle of the drilling device 10 according to the invention.

At the start, the bore 100 is prepared, for instance by means of an excavator, and the foundation 34 is placed in position. A drive-up frame 33 is erected on the foundation 34. The fully assembled drilling device 10 is introduced within this drive-up frame 33 and the bore 100 and is filled with water or bentonite suspension 110.

Figure 9B:
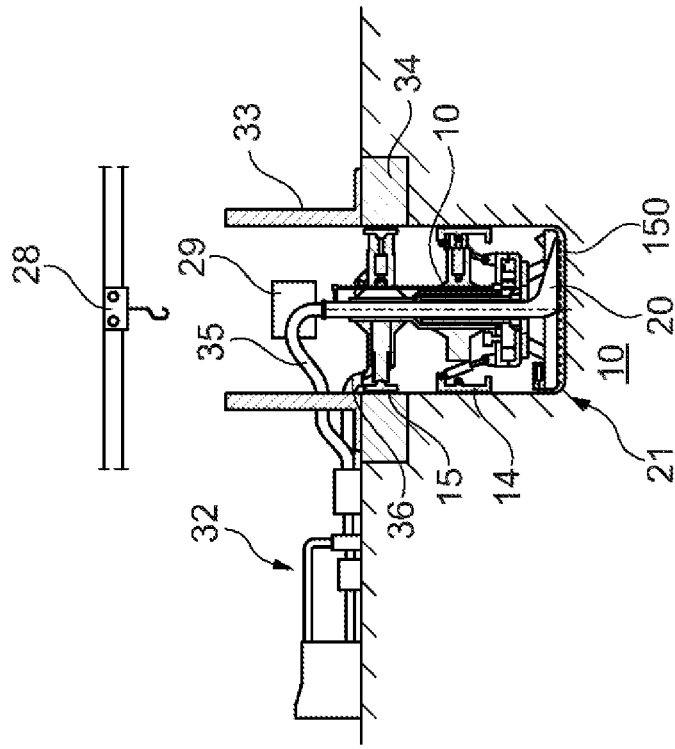
Figure 9A:
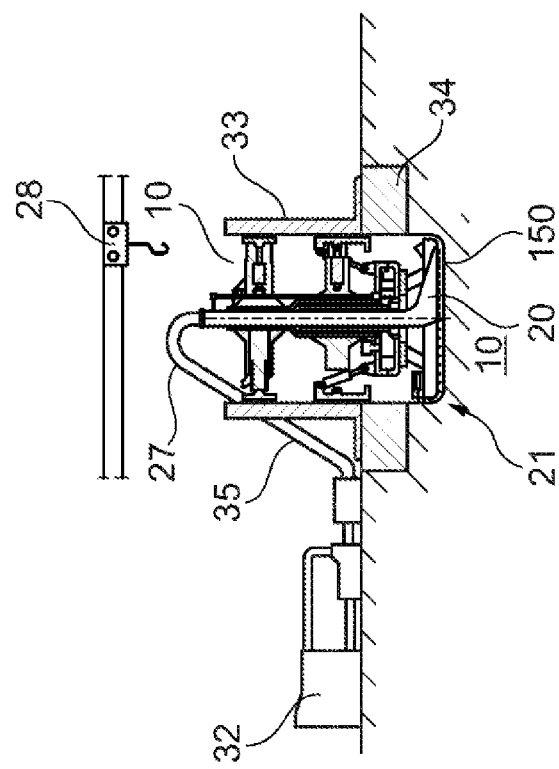

The drilling device 10 can be driven into the ground by virtue of its own weight by actuation of the cutting wheel 21 (FIG. 9B).

Figure 9C:
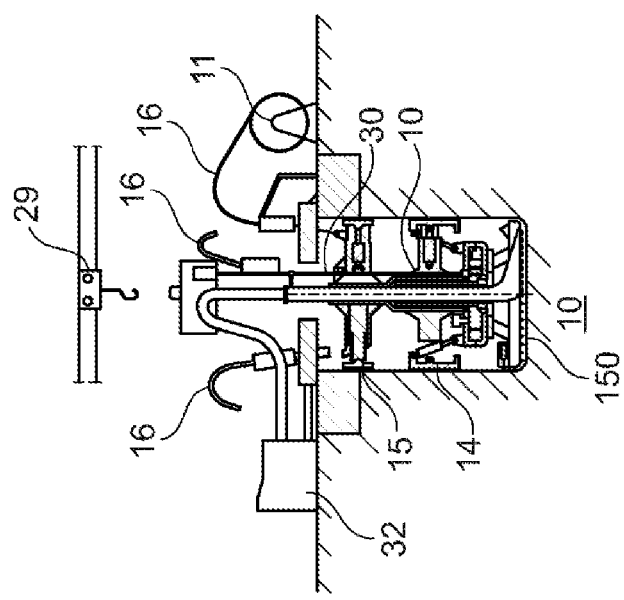

The drive-up frame 33 is subsequently removed, and the strand-jack system 11 is installed (FIG. 9c). At this time, the drilling device 10 has been fully installed and is able to carry out the drilling.

Figure 9D:
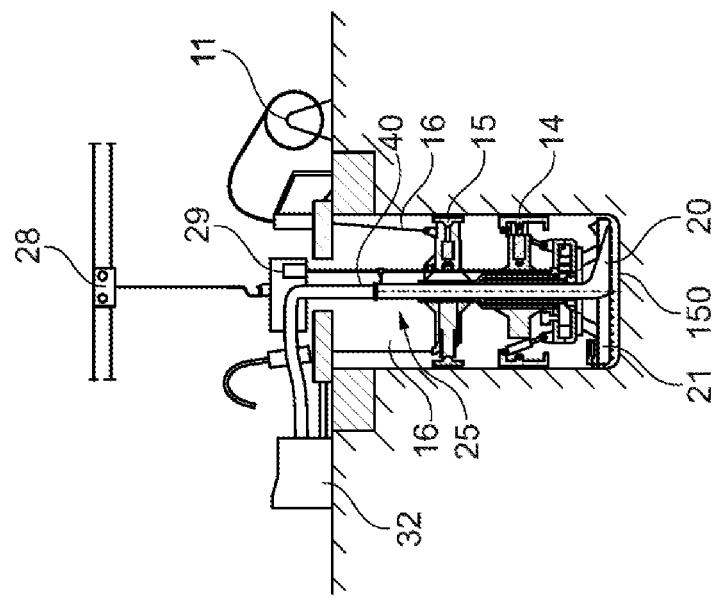

FIGS. 9D to 9F show the situation where the drilling device 10 has been sunk by drilling to such an extent that the conveying pipeline 25 and the drivetrain 30 have to be lengthened.

For this purpose, the top box 29 is removed with a portal crane 28, and a new pipe section 40 is assembled. The latter is connected via the flanges 44 to the pipe section 40 already located beneath it. Furthermore, the connecting elements 42 of the individual drive rods 41 interlock.

Once the assembly of the next pipe section 40 has been concluded, the top box 29 (FIG. 9F) is assembled again. Subsequently the drilling can be continued.

The invention claimed is:

1. A drilling device for sinking a vertical borehole, including a shaft, an extraction borehole in a deposit body, or a foundation borehole in the ground, comprising:
   at least one excavating tool configured to excavate material at a bottom of the borehole;
   at least one conveying element, arranged in the active region of the at least one excavating tool, configured to discharge material excavated at the bottom out of the borehole;
   a machine frame on which at least two bracing elements for locking the device in the borehole during drilling are arranged;
   at least one element configured to vertically raise and lower the drilling device in the borehole, and;
   at least one drive configured to rotate the excavating tool
   wherein the element configured to vertically raise and lower the drilling device in the borehole is a strand-jack system comprising at least one jack unit with at least one cylinder and with at least one strand or a strand bundle per jack unit, said strand or strand bundle being connected to the machine frame.

2. The drilling device as claimed in claim 1, wherein the borehole is filled with a liquid, including at least one of water or a bentonite suspension.

3. The drilling device as claimed in claim 2, wherein discharge is via a reverse-circulation method.

4. The drilling device as claimed in claim 1, wherein the at least one conveying element configured to discharge material excavated at the bottom out of the borehole includes a vertical conveying pipeline which extends through the machine frame.

5. The drilling device as claimed in claim 4, wherein the conveying pipeline does not rotate.

6. The drilling device as claimed in claim 4, wherein the conveying pipeline is constructed from pipe sections, to one of successively lengthen or shorten the conveying pipeline.

7. The drilling device as claimed in claim 6, wherein at least one pipe section includes at least one flange element for connecting to a further pipe section.

8. The drilling device as claimed in claim 6, wherein at least one pipe section includes at least one guide element, said at least one guide element guiding an element of a drivetrain, and said guide element including at least one bearing element.

9. The drilling device as claimed in claim 6, wherein at least one pipe section includes at least one guide element for a supply line.

10. The drilling device as claimed in claim 1, wherein the excavating tool includes a suction chamber for loosened rock.

11. The drilling device as claimed in claim 1, wherein the excavating tool is a cutting wheel, with full-face cutting, including extendable and retractable edge-cutting tools, including disks or chisels.

12. The drilling device as claimed in claim 1, wherein the excavating tool is displaceable in the excavating direction with respect to the machine frame.

13. The drilling device as claimed in claim 1, wherein at least one feed system, is a cylinder, is which presses the excavating tool for loosening rock against the bottom of the borehole to generate the necessary loosening pressure.

14. The drilling device as claimed in claim 1, wherein the at least one drive is at least one of a hydraulic or electric drive.

15. The drilling device as claimed in claim 14, wherein the drive is arranged on the drilling device.

16. A drilling device for sinking a vertical borehole, including a shaft, an extraction borehole in a deposit body, or a foundation borehole in the ground, comprising:
   at least one excavating tool configured to excavate material at a bottom of the borehole;
   at least one conveying element, arranged in the active region of the at least one excavating tool, configured to discharge material excavated at the bottom out of the borehole;
   a machine frame on which at least two bracing elements for locking the device in the borehole during drilling are arranged;
   at least one element configured to vertically raise and lower the drilling device in the borehole, and;
   at least one drive configured to rotate the excavating tool, wherein the at least one drive includes a drive unit above ground which is connected to a drive element of the excavating tool, and wherein the drive unit is connected to the drive element of the excavating tool via at least one telescopic drivetrain.

17. The drilling device as claimed in claim 16, wherein the connection is via a gear mechanism, including a reduction-gear mechanism.

18. The drilling device as claimed in claim 16, wherein the drivetrain includes at least one of individual rods or tube elements.

19. The drilling device as claimed in claim 18, wherein the at least one of individual rods or tube elements are separably connected to one another via connecting elements including at least one of threads or claw couplings.

20. The drilling device as claimed in claim 18, wherein the at least one of individual rods or tube elements are guided along the pipe section via guide elements included along the pipe sections in bearing elements.

21. The drilling device as claimed in claim 16, wherein at least one rod is telescopic, to enable the drilling stroke of the excavating tool.

22. The drilling device as claimed in claim 16, wherein the at least one drive includes at least one gear unit to provide the necessary speed of rotation of the excavating tool.

* * * * *